N. P. ANDERSON.
PLANT PROTECTOR AND FORCER.
APPLICATION FILED JUNE 20, 1917.
1,290,478.
Patented Jan. 7, 1919.
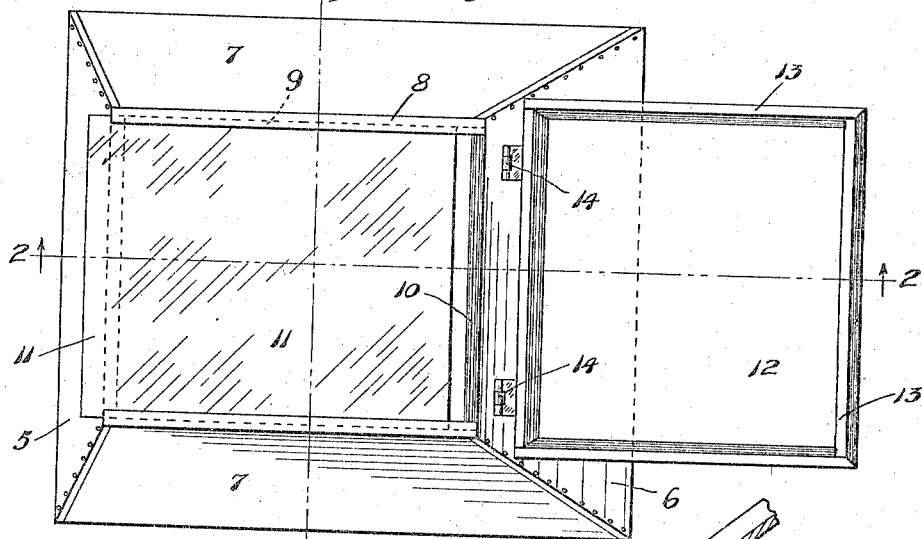
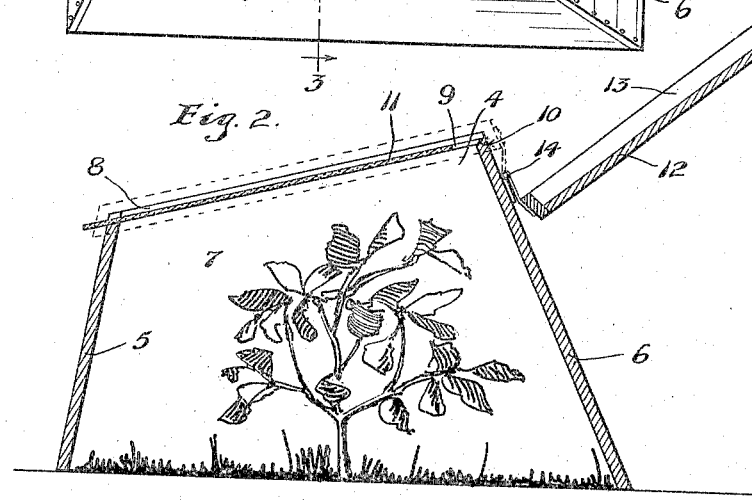
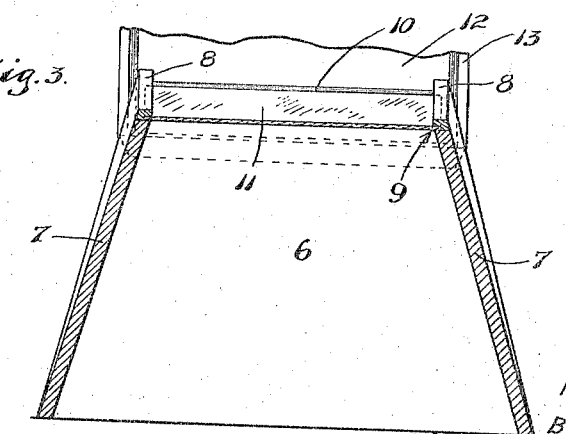
WITNESSES
H. L. Opsahl.
E. C. Wells
INVENTOR
N. P. ANDERSON
BY HIS ATTORNEYS
Williamson Merchant

UNITED STATES PATENT OFFICE.

NELS P. ANDERSON, OF ROBBINSDALE, MINNESOTA.

PLANT PROTECTOR AND FORCER.

1,290,478.  Specification of Letters Patent.  Patented Jan. 7, 1919.

Application filed June 20, 1917. Serial No. 175,897.

*To all whom it may concern:*

Be it known that I, NELS P. ANDERSON, a citizen of the United States, residing at Robbinsdale, in the county of Hennepin and State of Minnesota, have invented certain new and useful Improvements in Plant Protectors and Forcers; and I do hereby declare the following to be a full, clear, and exact description of the invention, such as will enable others skilled in the art to which it appertains to make and use the same.

My invention relates to plant protectors and forcers; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a plan view of the invention with the glass window-pane partly open and with the cover thereof entirely open;

Fig. 2 is a longitudinal vertical section taken on the line 2—2 of Fig. 1; and

Fig. 3 is a transverse vertical section taken on the line 3—3 of Fig. 1.

The invention is in the form of a box-like structure with an oblique window opening 4, which slopes from the front to the rear, and having upwardly converging front, rear and side walls 5, 6 and 7, respectively. Cleats 8, having grooves 9, are nailed to the upper edges of the side walls 7 and it will be noted, by reference to Fig. 2, that the upper edge of the rear wall 6 is beveled at 10 and that said bevel transversely intersects the grooves 9.

A glass window-pane 11 for the window opening 4 is mounted in the grooves 9, for sliding movement over the upper edge of the front wall 5, which, as shown, is beveled to fit the same and engages the beveled edge 10 of the rear wall 6 and lifts said glass window-pane into tight contact with the cleats 8 to form a tight joint therebetween. Fitted over the window opening 4, is a cover 12, having outwardly flaring flanges 13 which engage the walls 5, 6 and 7 and support said cover therefrom and above the window-pane, so that there is an air space therebetween. This cover 12 is secured by hinges 14 to the rear wall 6 and which hinges are designed to support the cover, when open, as shown in Fig. 2, so as to not come in contact with the ground.

The above described invention is especially intended for market gardeners and is designed to protect vegetables or other plants against frost and cold weather and to force the growth thereof, so that the gardener may get his products onto the market much earlier than he otherwise could and thus secure fancy prices therefor.

The device is to be placed over a vegetable or other plant with the oblique window opening facing the south. By providing the structure with upwardly converging sides, it is possible to cover an area of ground thereby, substantially again the size of the window opening therein, and by making the back wall with a greater convergence than the front wall, it is possible to place the structure over a plant, so that said plant is located substantially directly under the highest point therein, as shown in Fig. 2, thus providing plenty of room for the plant to grow in. The oblique window-pane will admit light back of the plant, as well as on all sides thereof. During the day, if the temperature in the structure is too high, the glass window-pane may be opened to a more or less degree, and on cold nights, the cover may be closed.

What I claim is:—

1. A plant protector and forcer comprising a rectangular box-like structure having an open top and a forwardly inclined back wall that extends above the front wall, the upper edge of said back wall being beveled, inclined guide slots in the side walls, and a glass window pane mounted in said guides for sliding movement to and from a closed position over the upper edge of the front wall, said window pane when closed engaging the beveled upper edge of the back wall to frictionally hold the same in closed position.

2. A plant protector and forcer comprising a rectangular box-like structure having an open top and a forwardly inclined back wall that extends above the front wall thereof, inclined guide slots in the side walls, a glass window pane mounted in said guides for sliding movement to and from a closed position over the upper edge of the front wall, and a cover with a depending marginal flange hinged to said back wall, capping the structure when closed and holding the glass window pane in a closed position.

In testimony whereof I affix my signature in presence of two witnesses.

NELS P. ANDERSON.

Witnesses:
CLARE DEMAREST,
HARRY D. KILGORE.

Copies of this patent may be obtained for five cents each, by addressing the "Commissioner of Patents. Washington, D. C."